United States Patent
Camarotto et al.

(10) Patent No.: US 12,454,085 B2
(45) Date of Patent: Oct. 28, 2025

(54) COMPONENT FOR A NOZZLE OF AN INJECTION MOLDING APPARATUS AS WELL AS CORRESPONDING NOZZLE AND INJECTION MOLDING APPARATUS

(71) Applicant: S.I.P.A. SOCIETA' INDUSTRIALIZZAZIONE PROGETTAZIONE E AUTOMAZIONE S.P.A., Vittorio Veneto (IT)

(72) Inventors: Simone Camarotto, Caneva (IT); Paolo Spinazze', San Vendemiano (IT); Matteo Zoppas, Conegliano (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 235 days.

(21) Appl. No.: 17/904,277

(22) PCT Filed: Mar. 2, 2021

(86) PCT No.: PCT/IB2021/051726
§ 371 (c)(1),
(2) Date: Aug. 15, 2022

(87) PCT Pub. No.: WO2021/176346
PCT Pub. Date: Sep. 10, 2021

(65) Prior Publication Data
US 2023/0140576 A1    May 4, 2023

(30) Foreign Application Priority Data

Mar. 2, 2020 (IT) .......... 102020000004351

(51) Int. Cl.
*B29C 45/23* (2006.01)
*B29C 45/27* (2006.01)

(52) U.S. Cl.
CPC .......... *B29C 45/231* (2013.01); *B29C 45/278* (2013.01); *B29C 2045/237* (2013.01)

(58) Field of Classification Search
CPC ................ B29C 45/231; B29C 45/278; B29C 2045/237; B29C 45/2806; B29C 2045/2889; B29C 45/20
See application file for complete search history.

(56) References Cited

U.S. PATENT DOCUMENTS 3,952,927 A    4/1976  Schaumburg et al.
4,303,382 A *  12/1981 Gellert .................... B29C 45/30
                                               264/328.12
(Continued)

FOREIGN PATENT DOCUMENTS

CN    202685235    †   1/2013
CN    202685235 U      1/2013
(Continued)

OTHER PUBLICATIONS

Patent Cooperation Treaty, International Search Report and Written Opinion for International Application No. PCT/IB2021/051726, Jun. 2, 2021, 18 pages.

(Continued)

*Primary Examiner* — Nahida Sultana
(74) *Attorney, Agent, or Firm* — Stetina Garred Brucker & Newboles

(57) ABSTRACT

A component for a nozzle for injecting molten plastic into a molding cavity of a container, in particular of a test tube or a bottle preform,
the component comprising a first body in which a shutter can slide along an axis;
(Continued)

wherein the first body has a wall which extends about said axis;

wherein said wall is provided with a first zone adapted to guide the sliding of the shutter along the axis, and a second zone which delimits a first stretch of a channel for the molten plastic;

wherein said first body is provided with at least one through hole which crosses said wall, in particular transversely to the axis, which allows the molten plastic to pass through, in particular to enter, said first stretch of the channel.

17 Claims, 6 Drawing Sheets

(56) References Cited

U.S. PATENT DOCUMENTS

| | | | |
|---|---|---|---|
| 5,022,846 A | | 6/1991 | Schmidt |
| 5,059,113 A | | 10/1991 | Ito et al. |
| 5,151,025 A | * | 9/1992 | Muller .................. B29C 45/20 |
| | | | 425/549 |
| 5,505,613 A | † | 4/1996 | Krummenacher |
| 5,895,669 A | * | 4/1999 | Seres, Jr. .............. B29C 45/278 |
| | | | 425/549 |
| 6,214,275 B1 | | 4/2001 | Catoen |
| 6,220,850 B1 | | 4/2001 | Catoen et al. |
| 7,780,435 B2 | * | 8/2010 | Huang ................ B29C 45/1781 |
| | | | 425/569 |
| 2006/0018993 A1 | | 1/2006 | Fairy |
| 2007/0082083 A1 | | 4/2007 | Fairy |
| 2014/0103578 A1 | | 4/2014 | Rossi et al. |
| 2017/0057138 A1 | * | 3/2017 | Fattori .................. B29C 45/20 |
| 2017/0312961 A1 | | 11/2017 | Muhlemann |
| 2020/0331182 A1 | * | 10/2020 | Bajwa .................. B29C 45/20 |

FOREIGN PATENT DOCUMENTS

| | | | |
|---|---|---|---|
| DE | 931677 | C | 8/1955 |
| DE | 1948465 | A1 | 4/1971 |
| DE | 102014119422 | † | 3/2016 |
| DE | 102014119422 | B3 | 3/2016 |
| EP | 4114638 | A1 | 1/2023 |
| FR | 2481189 | A1 | 10/1981 |
| FR | 2837738 | A1 | 10/2003 |
| GB | 911028 | A | 11/1962 |
| KR | 200339865 | Y1 | 1/2004 |
| KR | 200404212 | Y1 | 12/2005 |
| KR | 10-20090085441 | † | 8/2009 |
| KR | 20090085441 | A | 8/2009 |
| KR | 20100119484 | A | 11/2010 |
| WO | 9856557 | A1 | 12/1998 |

OTHER PUBLICATIONS

Chinese Office Action for Application No. 202180018424.9; mailed Jun. 24, 2025.

\* cited by examiner
† cited by third party

COMPONENT FOR A NOZZLE OF AN INJECTION MOLDING APPARATUS AS WELL AS CORRESPONDING NOZZLE AND INJECTION MOLDING APPARATUS

CROSS-REFERENCE TO RELATED APPLICATIONS

This application claims priority to PCT International Application No. PCT/IB2021/051726 filed on Mar. 2, 2021, which application claims priority to Italian Patent Application No. 102020000004351 filed on Mar. 2, 2020, the entire disclosures of which are expressly incorporated herein by reference.

STATEMENT RE: FEDERALLY SPONSORED RESEARCH/DEVELOPMENT

Not Applicable

BACKGROUND

Field of the Invention

The present invention relates to the field of molding plastic containers, for example for making bottle preforms or laboratory test tubes.

In particular, the invention relates to a component of a nozzle for an injection apparatus, or molding apparatus, a nozzle comprising such a component, and an injection apparatus comprising such a nozzle.

Background Art

Processes for molding plastic containers provide for a given amount of molten plastic to be injected into a molding cavity in which the plastic solidifies.

The apparatuses for molding preforms comprise one or more nozzles. Each nozzle is associated with a respective molding cavity and a respective shutter.

The nozzle serves to inject the molten plastic into the respective molding cavity, and the shutter serves to dose the amount of plastic to be injected.

The shutter can indeed slide along an axis in order to open and close the opening, also called inlet point, of the molding cavity.

It is important for the shutter to always be aligned with the opening of the molding cavity and therefore it must be suitably guided.

The known nozzles provide for the shutter to be guided by a guiding zone at the end portion of the nozzle, which is the portion closest to the inlet point of the molten plastic into the molding cavity.

Therefore, when the shutter is in closed position, the guiding zone is also very close to the tip of the shutter.

The guiding zone is hot and is in contact with the shutter. Therefore, the tip of the shutter is heated by the guiding zone.

This aspect is disadvantageous. Indeed, the heating of the tip of the shutter results in a longer time to allow the plastic to solidify in the molding cavity, in particular at the injection zone.

A further disadvantageous aspect of the known molding apparatuses is due to the resistance to the movement of the shutter towards the injection point. The resistance is applied by the molten plastic, in particular by the molten plastic in the guiding zone of the known nozzles. Therefore, there disadvantageously is a need for a significant force to bring the shutter to the closed position.

The need is therefore felt for a better nozzle with respect to the prior art.

SUMMARY OF THE INVENTION

It is an object of the present invention to make a component of a nozzle and a nozzle capable of effectively guiding the sliding of the shutter and which allows less heat to be transferred to the tip of the shutter with respect to the prior art.

It is another object of the present invention to reduce the force required to bring the shutter to the closed position.

It is another object of the present invention to avoid or minimize the formation of defects of the molded container.

The present invention achieves at least one of such objects, and other objects which will be apparent in light of the present description, by means of a component of a nozzle for injecting molten plastic into a molding cavity of a container, in particular of a test tube or a bottle preform, the component comprising a first body in which a shutter can slide along an axis;
wherein the first body defines an end portion of the nozzle and is provided with an opening from which the molten plastic can leave the nozzle, in particular to then enter the molding cavity;
wherein the first body has a wall which extends about said axis,
wherein said wall is provided with an inner surface having a first zone which is distal from the opening and is adapted to guide the sliding of the shutter along said axis, and a second zone which is proximal to the opening, which delimits a first stretch of a channel for the molten plastic and which delimits said opening;
wherein said first body is provided with at least one through hole which crosses said wall transversely to the axis, and which allows the molten plastic to pass through, in particular to enter, said first stretch of the channel;
the component comprising a second body which delimits a second stretch of the channel which is distal from the opening; the first body being inserted in the second body so that the molten plastic can pass from the second stretch to the first stretch, passing through said at least one through hole;
wherein said first zone has a first diameter and said second zone has a second diameter which is greater than the first diameter, or
wherein said second diameter is greater than or equal to the first diameter and the first body is made of a material having a lower thermal conductivity with respect to the material with which the second body is made.

The aforesaid component is also called nozzle insert or nozzle tip.

The component in particular is an insert.

The invention also relates to a nozzle.

The invention also relates to an injection apparatus, or molding apparatus.

Advantageously, the first zone allows the sliding of the shutter to be guided and to be kept aligned, i.e. centered, with respect to the opening (or injection point) of the molding cavity, in particular during all the steps of the molding process. The diameter of the first zone has a tolerance for obtaining an accurate sliding coupling with the shutter.

The first body allows the wear of other components of the molding apparatus to be reduced, in particular the wear of the component which delimits the molding cavity, more specifically the wear of the zone which delimits the injection point, because the shutter is guided by the first zone.

Advantageously, the first zone of the first body can guide the shutter both when passing from the closed position to the open position and when passing from the open position to the closed position.

In other words, during all the molding steps, the shutter advantageously always remains guided by the first body 1, in particular by the first zone.

The second zone is adapted to be proximal to the molding cavity and the first zone is adapted to be distal from the molding cavity.

In this manner, when the shutter is in closed position, the guiding zone (i.e. the first zone) is advantageously far enough from the tip of the shutter, whereby the tip of the shutter is not heated by the heat transmitted from the guiding zone to the shutter, or in any case it is heated much less with respect to the known nozzles.

This contrivance allows an improved cooling of the end portion, in particular of the tip, of the shutter during the closing step of the injection point. The time for the plastic in the molding cavity to solidify therefore is reduced and any defects associated with too high a temperature of the tip of the shutter are reduced.

In a first variant of the invention, the first body is made of a material having a low thermal conductivity, for example made of steel or titanium alloy or ceramic material, in order to further reduce the heat transmission from the first body to the shutter. In particular, the material of the first body has a lower thermal conductivity than the thermal conductivity of the material of the second body. In this manner, in particular, the second body can transmit heat (provided by heating means) to the molten plastic therein, while the transmission of heat from the first body to the shutter is significantly reduced. In this first variant, the second zone of the first body can have a diameter which is greater than or equal to the diameter of the first zone of said first body.

Moreover, it is preferable for the first body to be made of a material which is particularly resistant to wear, in particular having an adequate hardness, such as for example the aforesaid materials. Therefore, it is preferable for the material of the first body to have greater hardness with respect to the material of the second body.

Instead, in a second variant of the invention, the second zone of the first body has a greater diameter than the diameter of the first zone, and there is no need to provide materials with different thermal conductivity for the first and second body, respectively.

The second zone of the first body has a greater diameter than the outer diameter of the shutter, in particular of the end portion of the shutter.

Therefore, advantageously the second zone and the shutter substantially are not in contact with each other, and therefore substantially the second zone does not transmit heat to the shutter.

Moreover, the molten plastic can advantageously flow in the annular space between the shutter and the second zone, in particular when the shutter is in the closed position and in the passing from the open position to the closed position.

This aspect is advantageous because the molten plastic can flow in a direction away from the molding cavity and possibly pass through the at least one through hole to return in the stretch of channel delimited by the second body of the component.

Therefore, the force required to bring the shutter from the open position to the closed position advantageously is reduced.

Advantageously the through hole, or the through holes, of the first body also act as filter, thus avoiding contaminants of a given dimension to be incorporated in the molded product. Moreover, since they are obtained in the side wall of the first body, the through holes allow a cleansing action of the end portion of the shutter, removing the possible residual material of the preceding molding operation and decreasing the shadow effect on the tip of the shutter.

Preferably, the first stretch and the second stretch of the channel are coaxial to each other and the shutter can slide in the second stretch of the channel.

The first body is inserted in the second body, in particular so that the molten plastic can pass from the second stretch to the first stretch of the channel, passing through said at least one through hole. In particular, the first body is inserted in the second body so that said first zone and said at least one through hole are inside said second stretch of the channel.

Preferably, the first body and the second body of the component of the invention are coaxial to each other.

Further features and advantages of the invention will become more apparent in light of the detailed description of non-exclusive, exemplary embodiments.

The dependent claims describe particular embodiments of the invention.

BRIEF DESCRIPTION OF THE DRAWINGS

In the description of the invention, reference is made to the accompanying drawings, which are provided by way of non-limiting example, in which.

The same elements, or functionally equivalent elements, have the same reference numeral.

DESCRIPTION OF EXAMPLE EMBODIMENTS OF THE INVENTION

Figure 1:
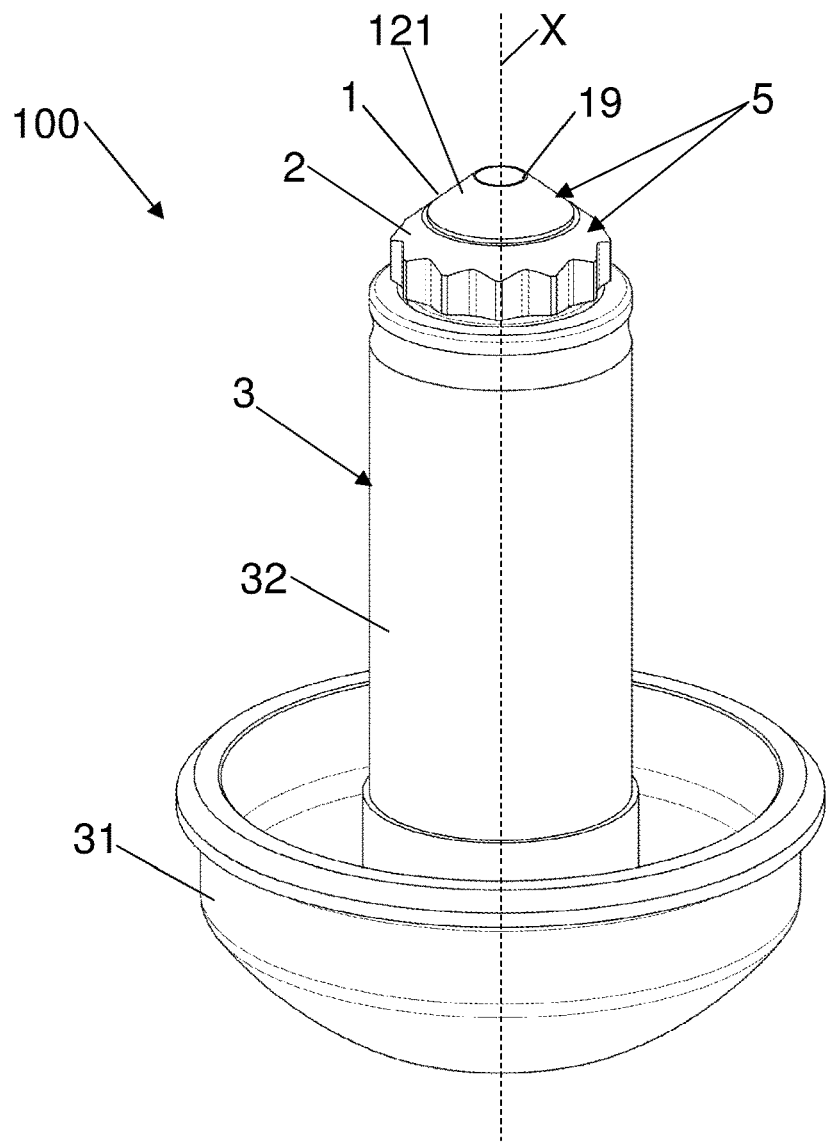
FIG. 1 shows a perspective view of a nozzle according to the invention.
Figure 2:
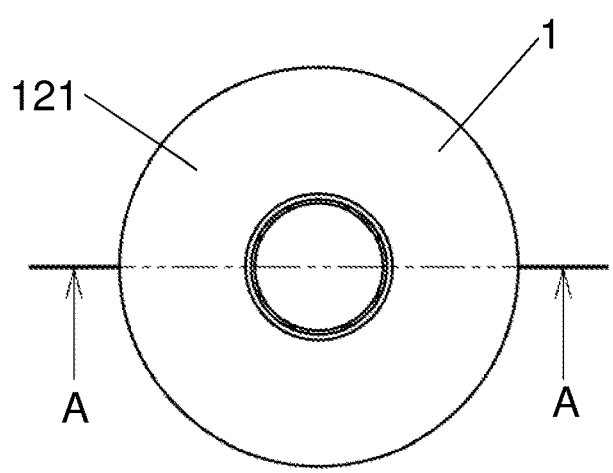
FIG. 2 shows a top plan view of a part of the nozzle in FIG. 1.
Figure 5:
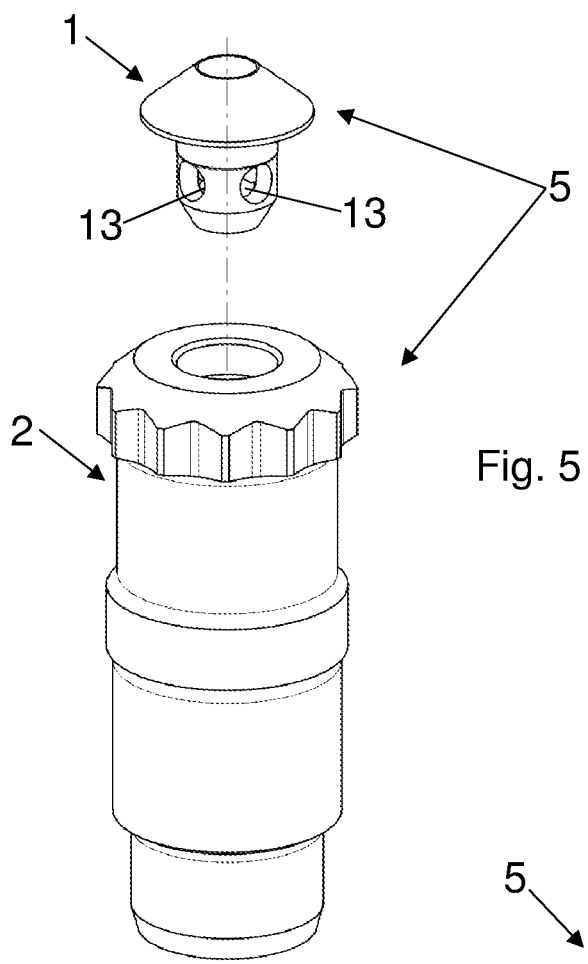
FIG. 5 shows an exploded perspective view of the component of a nozzle according to the invention.
Figure 6:
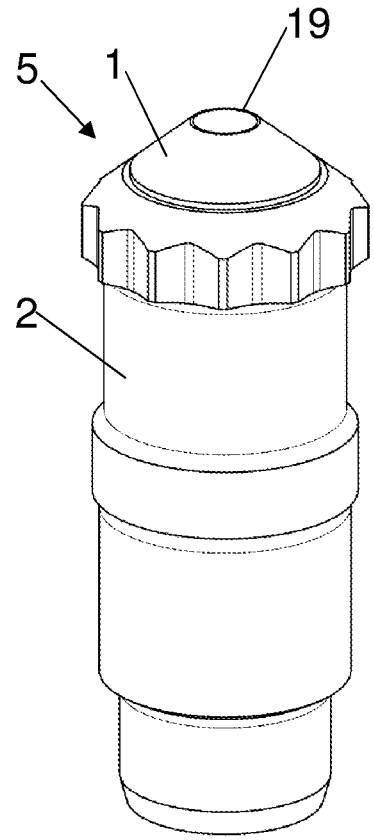
FIG. 6 shows the components in FIG. 5, assembled to one another.

With reference to the drawings, exemplary embodiments of a component 5 of a nozzle (see in particular FIGS. 1, 5 and 6), of a nozzle 100 and of an apparatus according to the invention, are described.

Nozzle 100 is in particular a component of an injection apparatus, or injection molding apparatus, for making plastic containers, such as for example bottle preforms or test tubes, in particular laboratory test tubes, for example test tubes for the chemical, pharmaceutical or medical field. The container is, for example made of polyethylene terephthalate (PET).

The injection apparatus in particular comprises a molding cavity 9 of a container and a shutter 8.

The injection apparatus can comprise a plurality of nozzles 100. Each nozzle 100 is associated with a respective shutter 8 and a respective molding cavity 9.

Nozzle 100 serves to inject the molten plastic into the molding cavity 9, in particular by cooperating with shutter 8 to dose the amount of plastic to be injected.

Nozzle 100 delimits a channel for the molten plastic, i.e. a channel for the passage for the molten plastic, which in particular is injected into the molding cavity 9.

Component 5 of the invention is also called nozzle insert or nozzle tip.

The component 5 of nozzle 100 in particular is an insert. Component 5 delimits a channel for the molten plastic. The channel delimited by component 5 in particular is a part of the channel delimited by nozzle 100.

Component 5 comprises a body 1, or first insert, also called first body for descriptive purposes.

Shutter 8 can slide in the nozzle 100, and in particular can slide in the component 5, and more particularly can slide in the body 1. The part of shutter 8 which can slide in body 1 in particular is cylindrical, i.e. it has a cylindrical outer surface.

Figure 3:
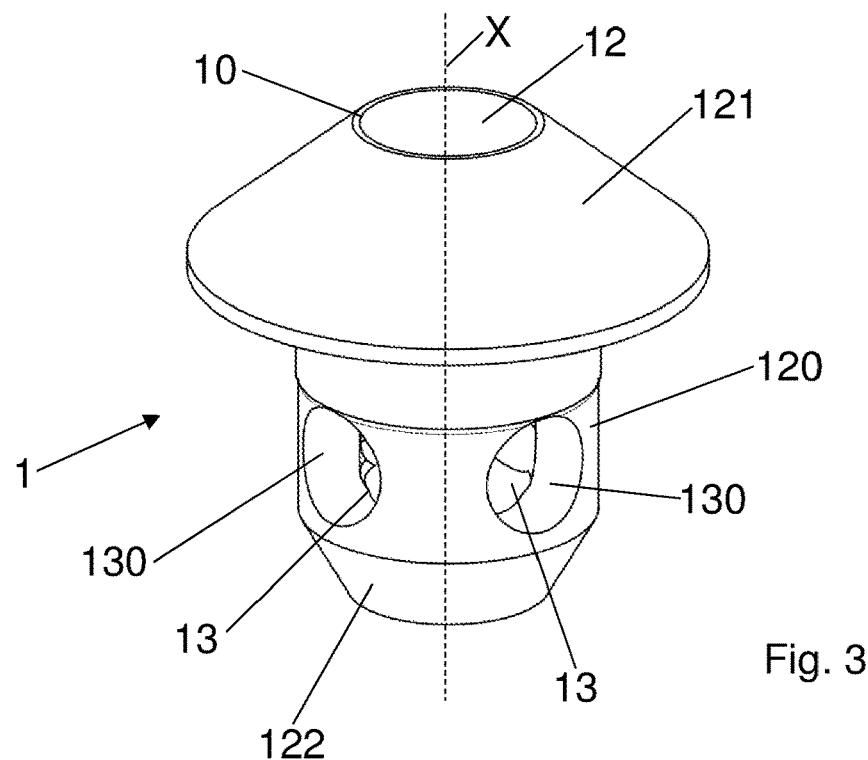
FIG. 3 shows a perspective view of the part in FIG. 2.
Figure 4:
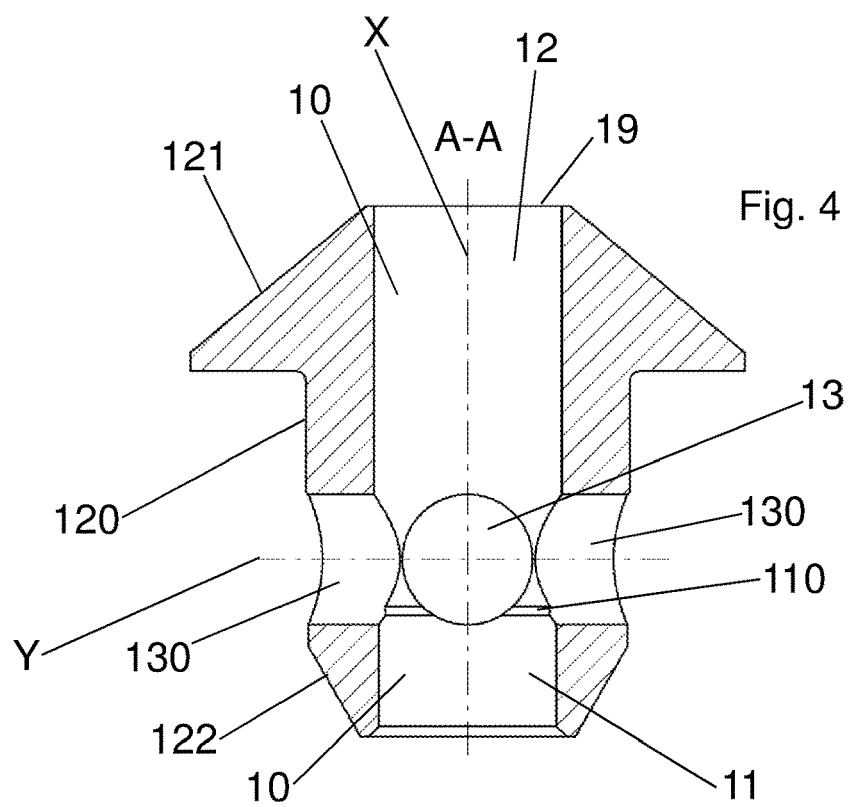
FIG. 4 shows a cross-section view of the part in FIG. 2.

Body 1 has a wall 10 (FIGS. 3 and 4), which comprises two zones 11, 12 or parts, also called first zone 11 (or guiding zone) and second zone 12 (or discharging zone), respectively, for descriptive purposes. Zone 11 and zone 12 in particular are zones of the inner surface of wall 10. Wall 10 in particular is a side wall of body 1.

Zone 11 is adapted to guide the sliding of shutter 8. In particular, the diameter of zone 11 and the outer diameter of shutter 8 are selected so that shutter 8 can slide over the zone 11 of body 1, which is fixed in position. In other words, the diameter of zone 11 is selected, in particular sized, according to the outer diameter of shutter 8 so that the latter can slide over zone 11, remaining in contact therewith, preferably with the entire zone 11.

Advantageously, zone 11 allows the sliding of shutter 8 to be guided and to be kept aligned, i.e. centered, with respect to opening 91 (or injection point) of the molding cavity 9, in particular during all the steps of the molding process.

Moreover, body 1, in particular zone 11, allows the wear of other components of the molding apparatus to be reduced, in particular of component 90 which delimits the molding cavity 9, more particularly of the zone which delimits the injection point 91.

The zone 12 of body 1 delimits a first stretch 101, i.e. a part, of the channel for the molten plastic of nozzle 100. Said first stretch 101 is an end stretch of the channel, proximal to the opening 19.

The diameter of zone 12 advantageously is greater than or equal to the diameter of zone 11.

The diameter of zone 12 preferably is greater than the diameter of zone 11, preferably at least 1% greater, for example from 1 to 25% or from 5 to 25%, preferably 5% or about 5% greater than the diameter of zone 11. In particular, there preferably is a step 110, preferably an annular step, between zone 12 and zone 11.

Wall 10 extends about an axis X and shutter 8 is adapted to slide along the axis X.

Wall 10 delimits a hole, in particular a through hole, of body 1 adapted to be crossed by shutter 8. In particular, shutter 8 can come out of an opening 19 (indicated in FIGS. 1 and 6) of body 1 delimited by zone 12. The molten plastic can leave nozzle 100 from the same opening 19, to then enter the molding cavity 9.

Figure 7:
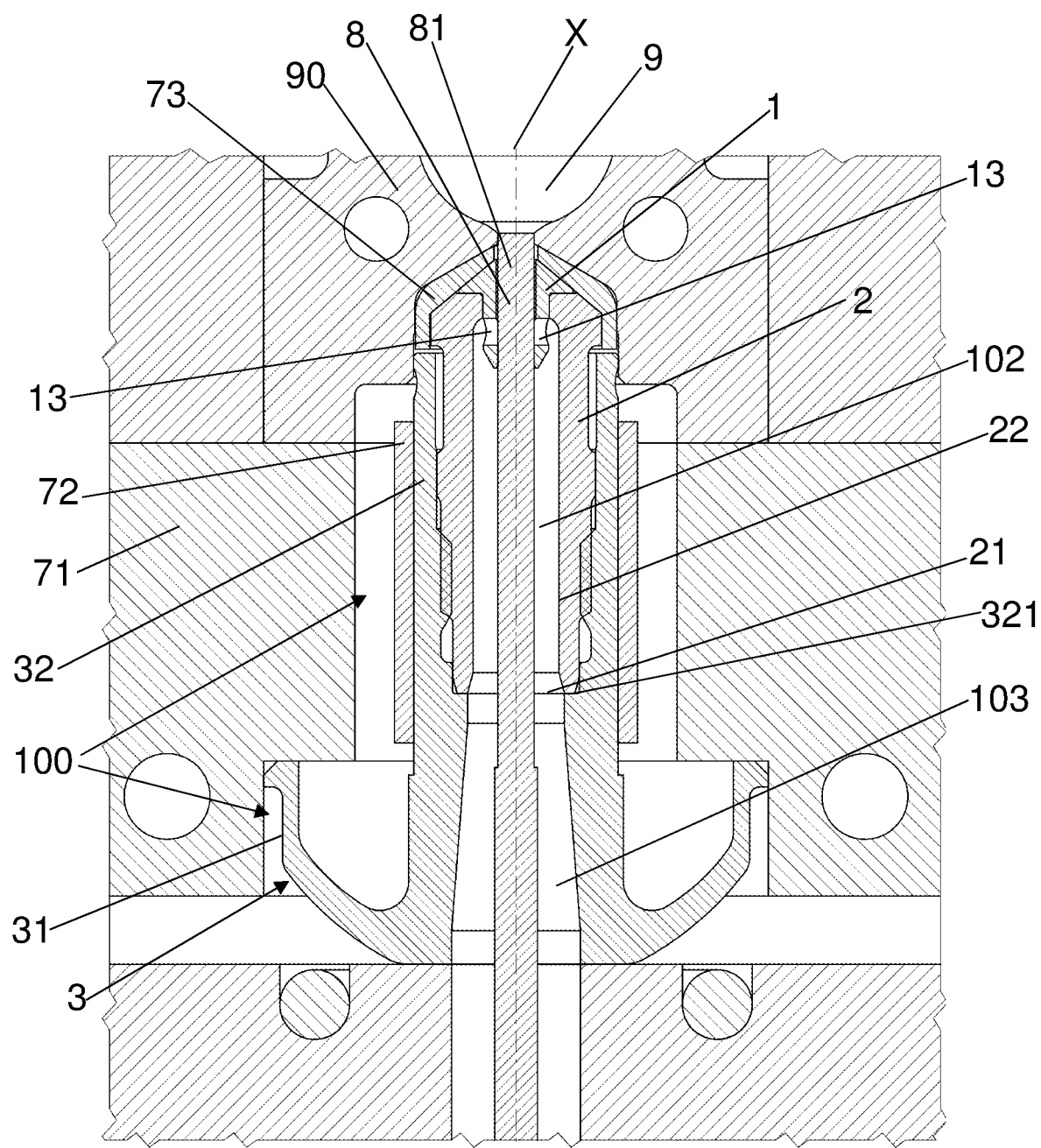
FIG. 7 shows a sectional view of the nozzle in FIG. 1 and of part of other components of an injection apparatus according to the invention, in a first configuration.
Figure 8:
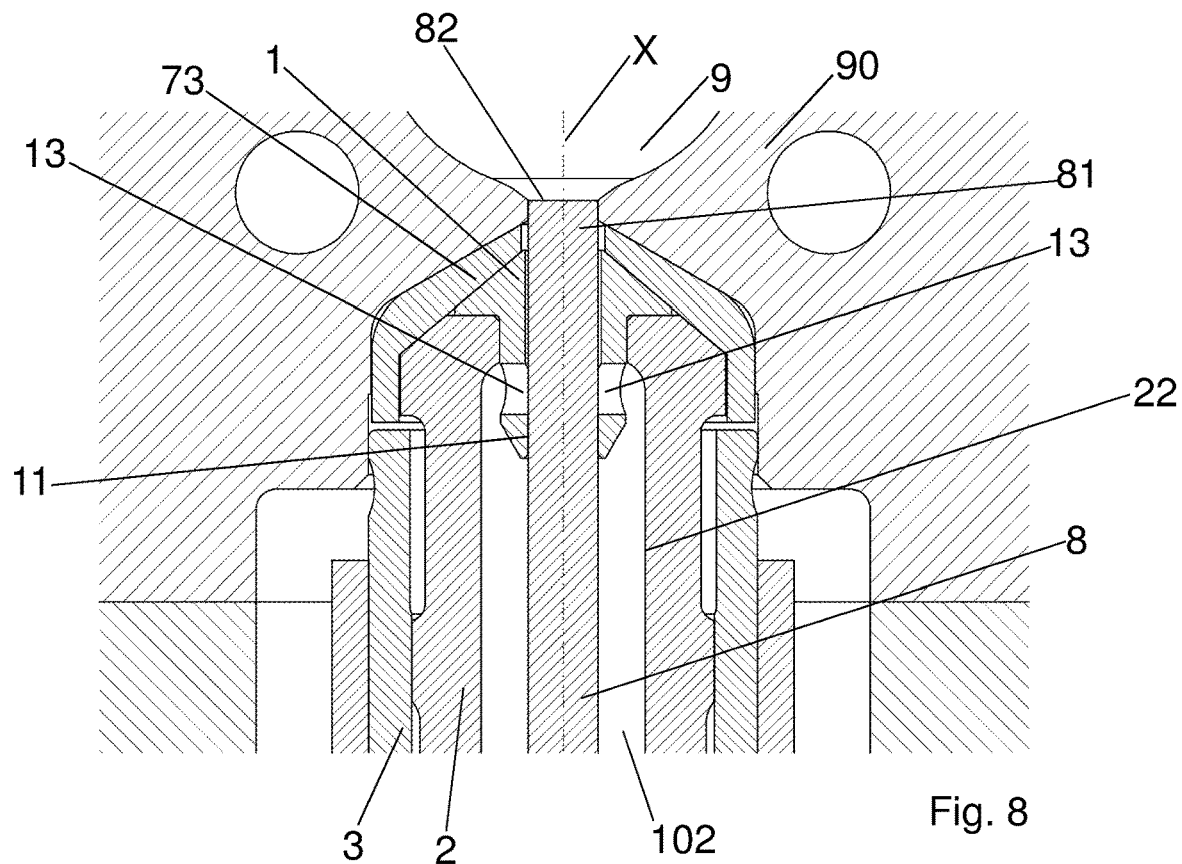
FIG. 8 shows an enlarged detail of FIG. 7.
Figure 9:
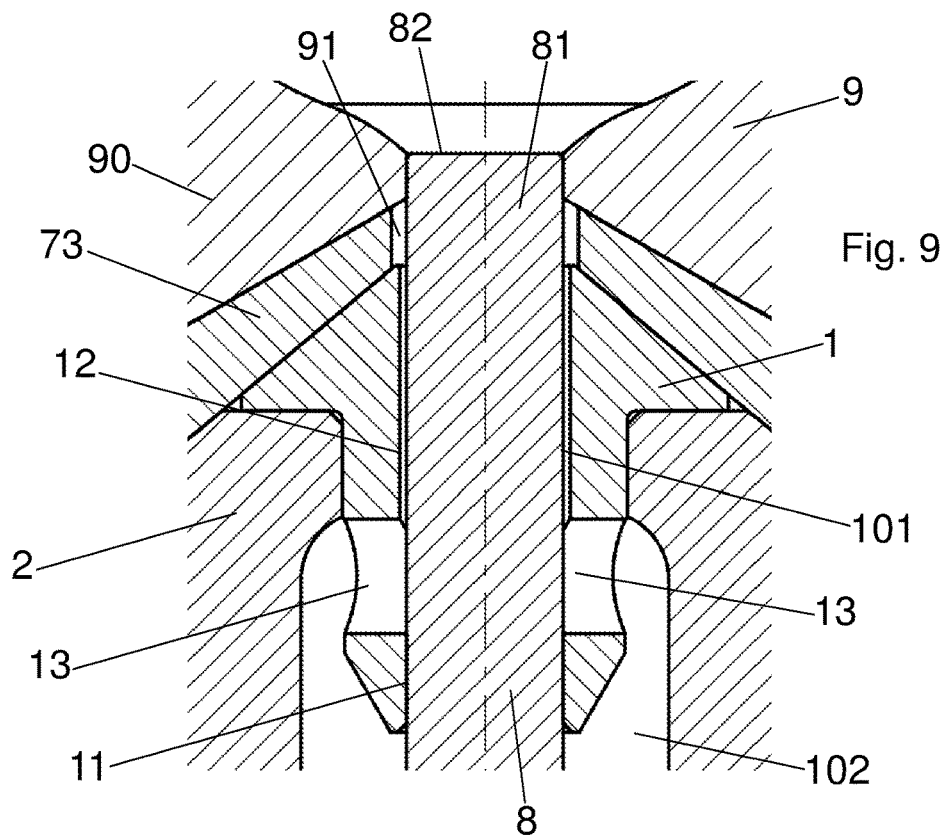
FIG. 9 shows an enlarged detail of FIG. 8.

In the configuration shown in FIGS. 7, 8 and 9, shutter 8 crosses body 1 and comes out thereof, and in particular is in a closed position.

Zone 11 and zone 12 are coaxial to each other, i.e. they extend about the same axis X.

Zone 11 preferably is cylindrical and/or zone 12 preferably is cylindrical.

Zone 11 and zone 12 are distinct from each other. In particular, zone 11 and zone 12 are at a different height from each other along axis X.

Preferably, zone 11 has a lower height along axis X with respect to the height of zone 12 along axis X.

Preferably, zone 11 has a height from 1 to 15 mm, for example from 2 to 3 mm, along axis X; and/or zone 12 has a height from 2 to 20 mm, for example from 7 to 8 mm, along axis X.

Body 1 is provided with at least one through hole 13, or opening, which allows the molten plastic to pass through, in particular to enter, in the stretch 101 of the channel for the molten plastic.

Said at least one through hole 13 crosses wall 10, in particular crosses wall 10 transversely to axis X; more particularly, crosses the thickness of wall 10.

In particular, said at least one through hole 13 extends from the inner surface to the outer surface of wall 10.

Said at least one through hole 13 is preferably provided between the two axial ends, considering axis X, of body 1, one of the two ends of which delimits opening 19 from which the molten plastic can leave.

Preferably, said at least one through hole 13 is provided between zone 11 and zone 12, in particular it is arranged at least partially between zone 11 and zone 12; and/or it is at least partially obtained in zone 12.

Preferably, a plurality of through holes 13, for example four through holes 13, is provided. Each through hole 13 is in particular made in wall 10, or side wall, of body 1. Each through hole 13 is delimited by a respective surface 130 (FIGS. 3 and 4), or wall, which extends about an axis Y which is transverse, preferably substantially orthogonal, with respect to axis X about which wall 10 extends, in particular about which the inner surface of wall 10 extends. Preferably, two through holes 13, or first through holes, are substantially coaxial to each other (i.e. the respective surfaces 130 extend about a same axis) and the other two through holes 13, or second through holes, are coaxial to each other. Preferably, the axis about which the surfaces 130 which delimit the two first through holes extend is transverse, preferably substantially orthogonal, to the axis about which the surfaces 130 of the two second through holes 13 extend.

Preferably, each through hole 13 has a section from 0.7 to 30 mm².

For example, in the case of circular shape, each through hole 13 can have a diameter from 1 to 6 mm.

It should be clear that the number of through holes 13 and the shape and the sizes thereof can differ from that described, according to operating needs.

Zone 12 of the inner surface of body 1 is proximal to opening 19, while zone 11 is distal from opening 19.

Therefore, zone 12 is adapted to be proximal to the molding cavity 9 and zone 11 is adapted to be distal from the molding cavity 9. In particular, when nozzle 100 is assembled with the molding cavity 9 (or more particularly, with component 90 in which the molding cavity 9 is made), zone 12 is proximal to the molding cavity 9 and zone 11 is distal from the molding cavity 9. In other words, zone 12 is between the molding cavity 9 and zone 11.

Advantageously, in this manner, when shutter 8 is in closed position, zone 11, or the guiding zone 11, is far enough from the tip 82 (FIGS. 8 and 9) of shutter 8, whereby tip 82 of the shutter is not heated by the heat transmitted from the guiding zone 11 to shutter 8, or in any case it is heated very low.

This contrivance allows an improved cooling of the end portion 81, in particular of tip 82, of shutter 8 during the closing step of the injection point 91, thus reducing the solidification time of the plastic in the molding cavity 9 and reducing possible defects associated with too high a temperature of the tip 82 of shutter 8.

In a variant of the invention, body 1 is made of a material having a low thermal conductivity, for example made of steel or titanium alloy or ceramic material, in order to further reduce the heat transmission from body 1 to the shutter.

Moreover, it is preferable for body 1 to be made of a material which is particularly resistant to wear, in particular having an adequate hardness, such as for example the aforesaid materials.

Preferably, body 1 comprises a cylindrical part 120 (FIGS. 3 and 4), in particular having a cylindrical outer surface and a head 121, or flange, adjacent to the cylindrical part 120 and projecting radially with respect thereto.

Head 121, in particular the outer surface thereof, is tapered towards the molding cavity 9.

Preferably, the outer surface of head 121 is frustoconical.

Preferably, zone 12 is partially obtained in head 121 and partially in the cylindrical part 120.

Preferably, the through holes 13 are made in the cylindrical part 120.

Preferably, the end portion 122 of body 1, opposite to head 121, has a tapered outer surface, preferably tapered in the direction distal from opening 19, and therefore from the molding cavity 9. The outer surface of the end portion 122 is, for example frustoconical. The tapered shape of the outer surface of the end portion 122 facilitates the flow of the molten plastic towards the through hole(s) 13. The outer surface of the end portion 122 can alternatively be cylindrical or have another shape.

Preferably, zone 11 is obtained in the cylindrical part 120 and/or in the end portion 122, for example partially in the cylindrical part 120 and partially in the end portion 122.

Component 5 also comprises a body 2, or second body or insert, which delimits a second stretch 102 of the channel for the molten plastic. Considering the advancement direction of the molten plastic in nozzle 100, the second stretch 102 is arranged upstream of the first stretch 101.

The first stretch 101 and the second stretch 102 extend along the same axis X.

In particular, body 2 has an inner surface 22 which extends about axis X and which delimits said second stretch 102.

Preferably, the first stretch 101 and the second stretch 102 are coaxial to each other.

Shutter 8 can slide in body 2, in particular in the second stretch 102 of the channel, and also in stretch 101 delimited by the zone 12 of body 1.

Body 1 is inserted in body 2, in particular so that zone 11 and the through holes 13 are in the stretch 102 of the channel, i.e. in the body 2.

Therefore, the molten plastic can leave stretch 102 and be introduced into stretch 101, passing through the through holes 13. In other words, stretch 102 is in communication, in particular in fluid communication, with stretch 101 by means of the through holes 13.

Stretch 101 is proximal to opening 19, and therefore to the molding cavity 9, and stretch 102 is distal from opening 19, and therefore distal from the molding cavity 9.

Preferably, body 1 defines an end portion of component 5 and an end portion of nozzle 100.

Preferably, body 1, in particular zone 12, projects outside with respect to body 2. In particular, zone 12 projects towards the molding cavity 9. Preferably, the part of body 1 which projects with respect to body 2 is the head 121.

Alternatively, body 1 can be non-projecting with respect to body 2.

Body 1 and body 2 are restrained to each other, preferably by interference coupling or by welding.

Alternatively, body 1 can be disassembled from nozzle 100, in particular it can be disassembled from body 2.

Preferably, body 1 and body 2 abut with each other.

Preferably, head 121, in particular a lower surface thereof, of body 1 abuts with a surface, in particular with an upper surface, of body 2.

The through holes 13 face an inner wall or inner surface 22 (in particular, an inner side wall or inner side surface 22) of body 2 and are spaced apart from said inner wall of body 2.

Preferably, at least one portion of the cylindrical part 120 which extends between the through holes 13 and head 121 along axis X is surrounded by a wall of body 2, and preferably is in contact with said wall of body 2.

In a first embodiment of the invention, body 1 and body 2 are made of a different material from each other. Advantageously, the material of body 1 has a lower thermal conductivity than the thermal conductivity of the material of body 2.

Preferably, the material of body 1 has a thermal conductivity comprised between 1 and 50 W m$^{-1}$ K$^{-1}$, preferably between 1 and 49 W m$^{-1}$ K$^{-1}$ or between 1 and 45 Wm$^{-1}$ K$^{-1}$, while the material of body 2 has a thermal conductivity comprised between 50 and 400 W m$^{-1}$K$^{-1}$, preferably comprised between 51 and 400 W m$^{-1}$ K$^{-1}$ or between 55 and 400 W m$^{-1}$ K$^{-1}$.

In this manner, in particular, body 2 can transmit heat—provided by the heating means- to the molten plastic therein, while the transmission of heat from body 1 to shutter 8 is significantly reduced. In this first embodiment, zone 12 of body 1 can have a diameter which is greater than or equal to the diameter of zone 11 of said body 1.

In particular, it is preferable for body 1 to be made of a material having a greater hardness with respect to the material with which body 2 is made.

In particular, the thermal conductivity and the hardness of the two materials are assessed under the same conditions, in particular at the same temperature.

Making body 1 with a material having a lower thermal conductivity allows the heat exchange to be reduced between body 1 and shutter 8, in particular so as to reduce the transfer of heat from zone 11 to the tip 82 of shutter 8 as much as possible.

Making body 1 with a material having greater hardness allows the operating life thereof to be lengthened because it is subject to wear due to the sliding of shutter 8 over zone 11.

Preferably, body 1 is made of steel or titanium alloy or ceramic material (as mentioned above), and body 2 is made of copper alloy or copper-beryllium alloy or aluminum alloy or molybdenum alloy or tungsten alloy.

Although it is advantageous to make body 1 and body 2 in different materials from each other, alternatively, body 1 and body 2 can be made of a same material, for example of steel or titanium alloy or copper alloy or copper-beryllium alloy or aluminum alloy or molybdenum alloy or tungsten alloy.

Indeed, in a second embodiment of the invention, the zone 12 of body 1 has a greater diameter than the diameter of zone 11, but there is no need to provide materials with different thermal conductivity for body 1 and body 2, respectively. Nozzle 100 preferably also comprises a body 3 which delimits a third stretch 103 of the channel for the molten plastic. Considering the advancement direction of the molten plastic in nozzle 100, the third stretch 103 is arranged upstream of the second stretch 102.

Stretch 103 communicates with stretch 102 of the channel, i.e. the molten plastic can pass from stretch 103 to stretch 102, in particular passing through an opening 21 (FIG. 7) of body 2 delimited by the wall thereof which extends about axis X.

Stretch 102 is between stretch 103 and stretch 101.

Stretch 102 and stretch 103 are coaxial to each other. Shutter 8 can slide in body 3, in particular in stretch 103.

The channel for the molten plastic of nozzle 100 comprises stretch 101, stretch 102 and stretch 103, with the through holes 13 of body 1 which put stretch 102 in communication with stretch 101.

The channel for the molten plastic of component 5 comprises stretch 101 and stretch 102.

Body 2 is inserted in body 3. Preferably, a part, in particular an end part, of body 2 projects outside with respect to body 3, in particular towards opening 19, and therefore towards the molding cavity 9. Preferably, body 1 is restrained to the part of body 2 which projects with respect to body 3. Preferably, the end edge of body 2 which delimits opening 21 (FIG. 7) abuts with an annular step 321 of the inner wall of body 3.

Body 2 and body 3 are restrained to each other, preferably they are screwed to each other and/or are restrained by means of a ring nut (not shown).

Preferably, body 3 comprises a cup or base 31 and a part 32, in particular a part 32 having a substantially cylindrical outer surface. The width, in particular the maximum width, orthogonally to the axis X of base 31, is greater than the width, in particular the maximum width, of part 32. Body 2 in particular is inserted in the part 32 of body 3.

As mentioned, an injection apparatus according to the invention for molding plastic containers comprises one or more nozzles 100.

Each nozzle 100, defining an axis X, cooperates with a respective shutter 8 and a respective molding cavity 9.

Each nozzle 100 is provided with an inner channel ending with an opening 19 for injecting molten plastic into the molding cavity 9.

Preferably, the molding cavity 9 is provided with a respective opening 91 through which it receives the molten plastic that comes out of nozzle 100, and therefore out of opening 19.

Shutter 8 slides in the inner channel along axis X from an advanced position, in which opening 19 is closed, to a retracted position, in which opening 19 is open.

Advantageously, nozzle 100 includes a component 5 comprising a first body 1, which is coaxial to axis X, defining an end portion of nozzle 100 which includes opening 19 and which delimits a first stretch 101 of the channel proximal to opening 19;

and a second body 2, which is coaxial to axis X and which delimits a second stretch 102 of the channel distal from opening 19;

wherein the first body 1 is at least partially inserted in the second body 2 so that the second stretch 102 is coaxial with and outside the first stretch 101;

wherein the first body 1 has a wall 10 which extends about said axis X, wherein said wall 10 is provided with an inner surface having a first zone 11 which is distal from opening 19 and is adapted to guide the sliding of shutter 8 along axis X, and a second zone 12 which is proximal to opening 19, which delimits said first stretch 101;

wherein the wall 10 is provided with at least one through hole 13 which is transverse to axis X, whereby the molten plastic passes from the second stretch 102 to the first stretch 101, passing through said at least one through hole 13 when shutter 8 is in the retracted position;

wherein said first zone 11 has a first diameter and said second zone 12 has a second diameter which is greater than the first diameter, or wherein said first zone 11 has a first diameter and said second zone 12 has a second diameter which is greater than or equal to the first diameter, and the first body 1 is made of a first material having a lower thermal conductivity than a second material with which the second body 2 is made.

Each nozzle 100 is restrained to a nozzle holder, also called nozzle holder plate 71 (partially shown in FIG. 7). In particular, the body 3 of nozzle 100 is restrained to the nozzle holder plate 71. More particularly, the base 31 of body 3 is restrained to the nozzle holder plate 71.

Heating means 72, for example one or more electrical heating elements, are preferably provided around body 3, in particular around part 32. The heating means 72 are, for example, fastened to the outer surface of body 3, in particular of part 32. The heating means 72 serve to heat or keep at the desired temperature the molten plastic which flows in stretch 102 and/or in stretch 103 of the channel.

Component 90, in which the molding cavity 9 is made, and the molding cavity 9 are partially shown in FIGS. 7 to 11. Preferably, component 90 is provided with a cooling system for cooling the plastic in the molding cavity 9.

Body 1 is inserted in component 90. Body 2 is preferably partially inserted in component 90 and partially extends in component 71.

A heat insulator 73 is preferably provided in component 90. The heat insulator 73 is preferably made of plastic, for example polyimide (PI), polytetrafluoroethylene (PTFE) or polyetheretherketone (PEEK) and in particular, is resistant to mechanical loads and high temperatures.

The heat insulator 73 is arranged between nozzle 100 and component 90, outside the molding cavity 9.

In particular, the heat insulator 73 covers the outer surface of the head 121 of body 1 and the part of body 2 which comes out of body 3. Preferably, said part of body 2 comprises a tapered surface portion having a taper angle which is substantially equal to the taper angle of the surface of the head 121 of body 1.

The heat insulator 73 is provided with a hole which is coaxial to axis X, in particular coaxial to the opening 19 of body 1. The hole of the heat insulator 73 can be crossed by shutter 8 and by the molten plastic. Preferably, the diameter of the hole of the heat insulator 73 is greater than or equal to the diameter of the zone 12 of body 1.

The molding cavity 9 is provided with an opening 91 through which the molten plastic that comes out of nozzle 100 can be introduced into the molding cavity 9. Opening 91 is also called gate or injection point. Typically, opening 91 is at the part of the molding cavity 9 which molds the bottom of the container. Opening 91 is coaxial to axis X, i.e. is delimited by a surface which extends about axis X.

Sliding along axis X, shutter 8 is adapted to switch from a closed position (FIGS. 7, 8 and 9) to an open position (FIGS. 10 and 11), and vice versa.

In the closed position, shutter 8 prevents the passage of the molten plastic through opening 91 of the molding cavity 9, and in particular the end portion 81 (which comprises tip 82) of shutter 8 obstructs opening 91. More particularly, shutter 8 prevents the molten plastic both from entering the molding cavity 9 and from leaving the molding cavity 9. Preferably, also the zone of component 90 which delimits the inlet opening 91 is adapted to guide the sliding of shutter 8.

When shutter 8 is in the open position, the molten plastic can enter the molding cavity 9. In particular, the molten plastic can pass from stretch 102 to stretch 101 of the channel, passing through the through holes 13, to then leave from nozzle 100, and the molten plastic which leaves from nozzle 100 can enter the molding cavity 9.

Advantageously, the apparatus is configured so that shutter 8 is guided by the zone 11 of body 1 both when passing from the closed position to the open position and when passing from the open position to the closed position.

In particular, in the open position, the end portion 81 of shutter 8 is surrounded by zone 11, and more particularly it is not surrounded by zone 12. In particular, in the open position, the end portion 81 of shutter 8 is in such a retracted position as to leave the outlet section of the through holes 13 at least partially free (FIG. 11).

In other words, shutter 8 advantageously always remains guided by body 1, in particular by zone 11, during all the molding steps.

Figure 10:
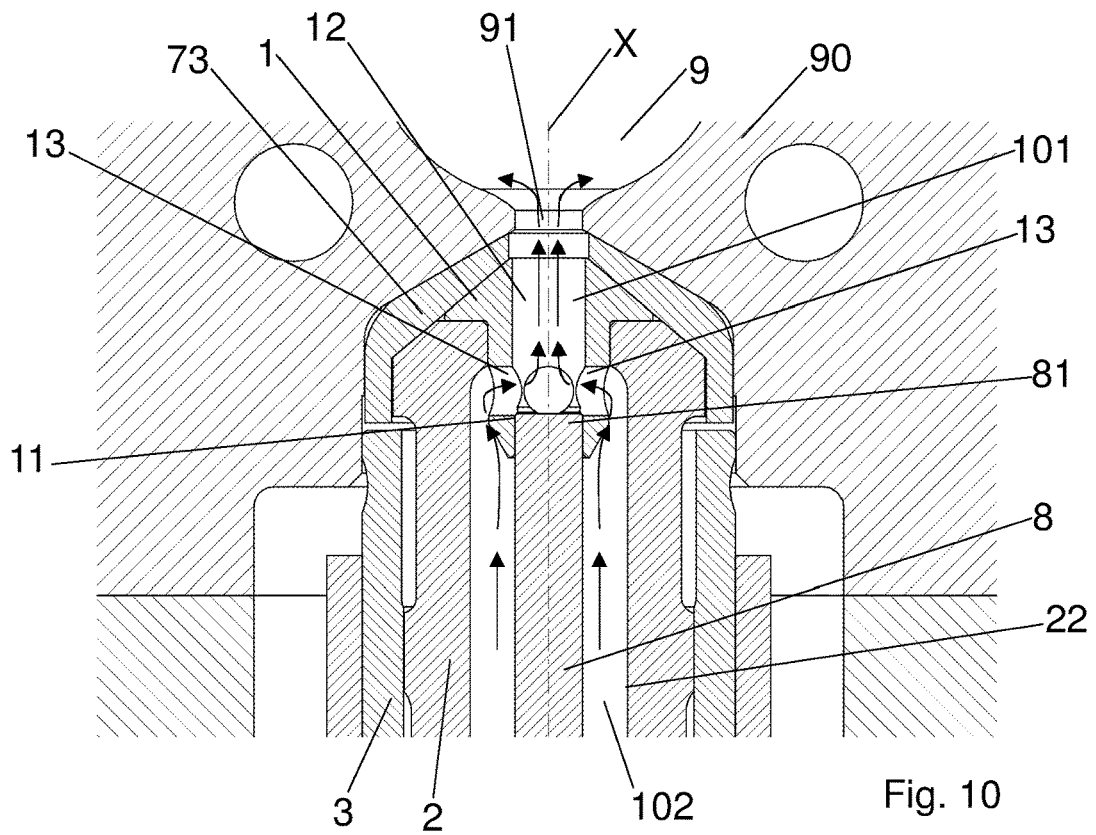
FIG. 10 shows a sectional view of the nozzle in FIG. 1 and of part of other components of an injection apparatus according to the invention, in a second configuration.
Figure 11:
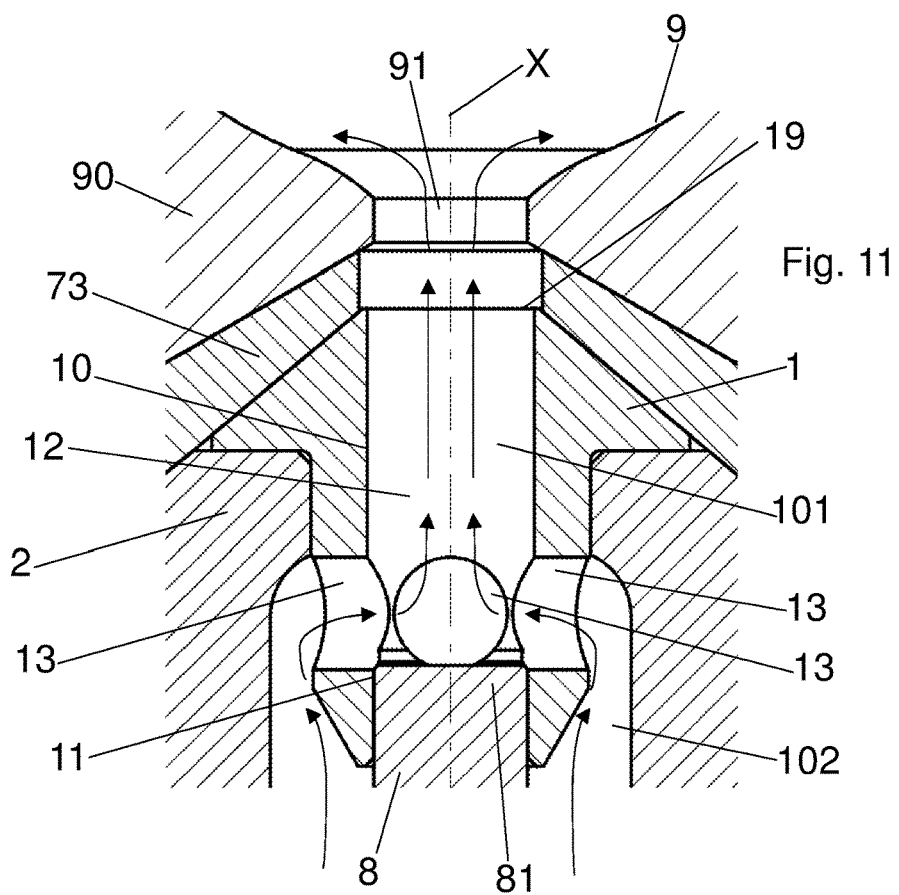
FIG. 11 shows an enlarged detail of FIG. 10.

FIGS. 10 and 11 diagrammatically indicate the path of the molten plastic by arrows.

In particular, the molten plastic crosses stretch 102 of the channel of the nozzle and then enters stretch 101 of the channel by passing through the through holes 13. The molten plastic then leaves body 1, passes through the hole of the heat insulator 73 (when provided) and enters the molding cavity 9, passing through opening 91.

As mentioned above, the diameter of zone 12 preferably is greater than the diameter of zone 11, the latter being adapted to guide the sliding of shutter 8. Therefore, the diameter of zone 12 is greater than the outer diameter of shutter 8, in particular of the end portion 81 of shutter 8.

Advantageously, therefore, zone 12 substantially does not transfer heat to shutter 8, in particular to the tip 82 thereof.

Moreover, the molten plastic can advantageously flow in the annular space (i.e. in part of stretch 101) between shutter 8 and zone 12, in particular when shutter 8 is in the closed position and in the switching from the closed position to the open position.

This aspect is advantageous because the molten plastic can flow in a direction away from the molding cavity 9 and possibly pass through the through holes 13 to return into stretch 102.

Therefore, the force required to bring shutter 8 from the open position to the closed position advantageously is reduced.

Preferably, the diameter of zone 12 is at least 1% greater than the outer diameter of shutter 8, for example from 1 to 25% or from 5 to 25%, preferably 5% or about 5% greater than the outer diameter of shutter 8.

Advantageously, the through holes 13 of body 1 also act as filter, thus avoiding contaminants of a given dimension to be incorporated in the molded product. Moreover, since the through holes 13 are obtained in the side wall of body 1, they allow a cleansing action of the end portion 81 of shutter 8, removing possible residual material of the preceding molding operation and decreasing the shadow effect on the tip 82 of shutter 8.

The invention claimed is:

1. An injection apparatus comprising:
at least one nozzle for injecting molten plastic into a molding cavity of a container;
the molding cavity for each nozzle; and
a shutter for each nozzle;
wherein each of the at least one nozzle includes a component comprising a first body in which the shutter can slide along an axis;
wherein the first body defines an end portion of the nozzle and is provided with an opening from which the molten plastic can leave the nozzle;
wherein the first body has a wall which extends about said axis;
wherein said wall is provided with an inner surface having a first zone which is distal from the opening and is adapted to guide the sliding of the shutter along the axis, and a second zone which is proximal to the opening, which delimits a first stretch of a channel for the molten plastic and which delimits said opening;
wherein said first body is provided with a plurality of through holes which crosses said wall transversely to the axis, and which allows the molten plastic to enter into said first stretch of the channel;
the component comprising a second body which delimits a second stretch of the channel which is distal from the opening; the first body being inserted in the second body so that the molten plastic can pass from the second stretch to the first stretch, passing through said at least one through hole;
wherein said first zone has a first diameter and said second zone has a second diameter which is greater than the first diameter, or wherein said first zone has a first diameter and said second zone has a second diameter which is greater than or equal to the first diameter, and the first body is made of a material having a lower thermal conductivity than the material with which the second body is made;
wherein said second zone of the first body is proximal to the molding cavity and said first zone of the first body is distal from the molding cavity;
wherein the shutter is adapted to pass from a closed position in which it prevents the molten plastic from passing through an opening of the molding cavity, to an open position, and vice versa;
the injection apparatus being configured so that the shutter is guided by the first zone of the first body both when passing from the closed position to the open position and when passing from the open position to the closed position;
wherein in the closed position the end portion of shutter, which comprises the tip of shutter, obstructs the opening;
wherein in the open position, the end portion of the shutter, which comprises the tip of shutter, is surrounded by the first zone, leaving the outlet section of the through holes at least partially free for the molten plastic to pass from the second stretch to the first stretch.

2. The injection apparatus according to claim 1, wherein the material of the first body has a thermal conductivity comprised between 1 and 50 W m$^{-1}$ K$^{-1}$, while the material of the second body has a thermal conductivity comprised between 50 and 400 W m$^{-1}$ K$^{-1}$.

3. The injection apparatus according to claim 1, wherein said second diameter of the second zone is at least 1% greater than the first diameter of the first zone.

4. The injection apparatus according to claim 1, wherein said plurality of through holes are provided, at least partially, between the first zone and the second zone and/or are at least partially made in the second zone.

5. The injection apparatus according to claim 1, wherein each through hole of said plurality of through holes is delimited by a respective surface which extends about an axis which is substantially orthogonal to said axis along which the shutter can slide.

6. The injection apparatus according to claim 1, wherein said first body is made of steel or titanium alloy or ceramic material.

7. The injection apparatus according to claim 1, wherein the first body and the second body are coaxial to the axis.

8. The injection apparatus according to claim 1, wherein the first body and the second body are restrained to each other.

9. The injection apparatus according to claim 1, wherein the first body is inserted in the second body so that said first zone and said plurality of through holes are inside said second body.

10. The injection apparatus according to claim 1, wherein said second zone of the first body projects, at least partially, outside the second body.

11. The injection apparatus according to claim 1, wherein the first body is made of a material having a greater hardness with respect to the material with which the second body is made.

12. The injection apparatus according to claim 1, wherein the first body is made of steel or titanium alloy or ceramic material, and the second body is made of copper alloy or copper-beryllium alloy or aluminum alloy or molybdenum alloy or tungsten alloy.

13. The injection apparatus according to claim 1, wherein there are provided at least two first through holes of said plurality of through holes which are substantially coaxial to each other.

14. The injection apparatus according to claim 1, wherein each of the at least one nozzle further includes a third body which delimits a third stretch of the channel which communicates with the second stretch of the channel.

15. The injection apparatus according to claim 14, wherein the second body is inserted in the third body.

16. The injection apparatus according to claim 1, wherein the diameter of the second zone is greater than the outer diameter of the shutter.

17. The injection apparatus according to claim 1, wherein the diameter of the first zone has a tolerance so as to obtain a sliding coupling with the shutter.

* * * * *